March 1, 1955 P. O. PINNEY 2,702,921
SHRIMP CUTTING MACHINE
Filed June 18, 1951 2 Sheets-Sheet 1
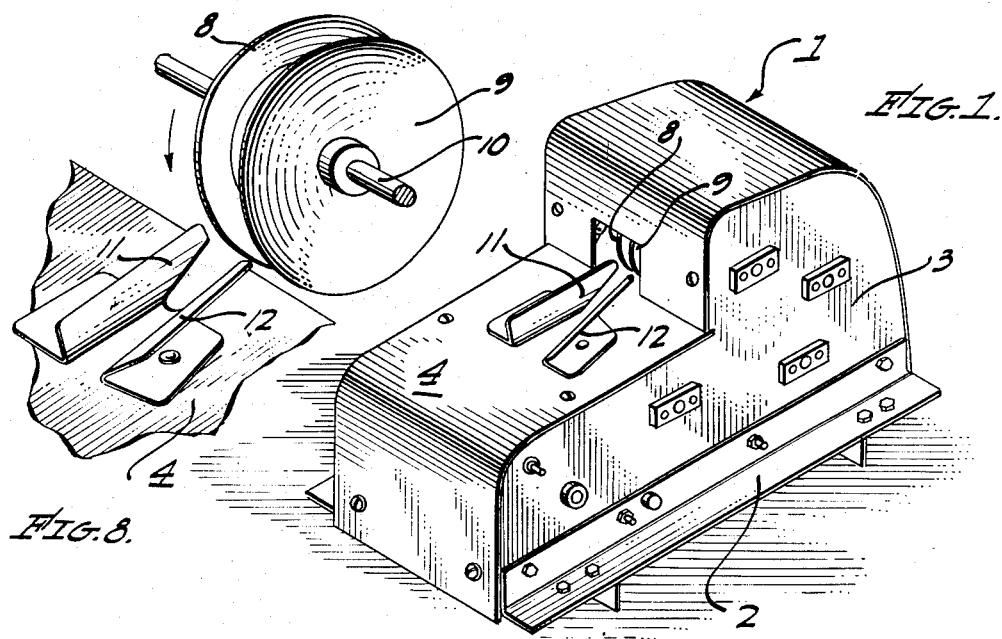
FIG. 1.
FIG. 8.
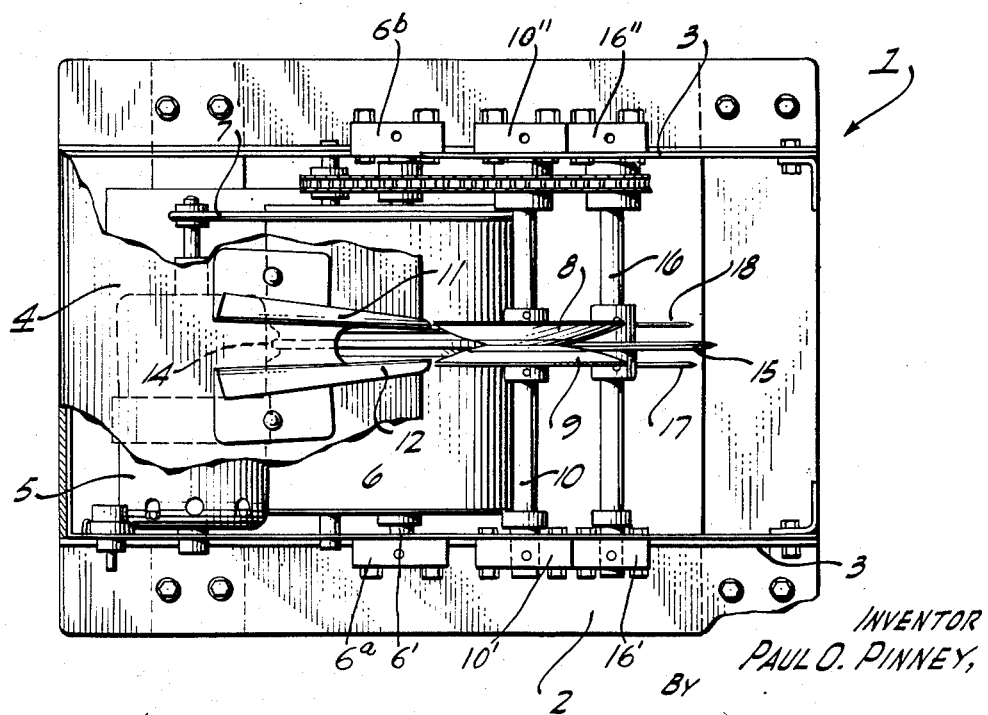
FIG. 2.
INVENTOR
PAUL O. PINNEY,
BY
ATTORNEY.

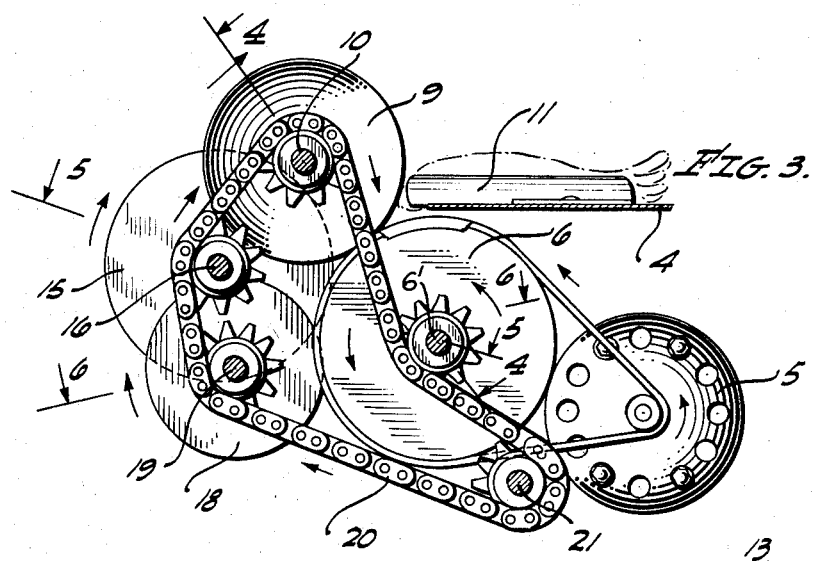
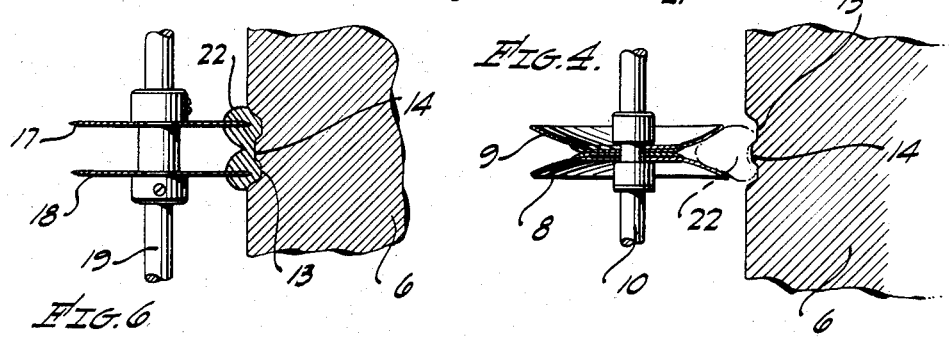
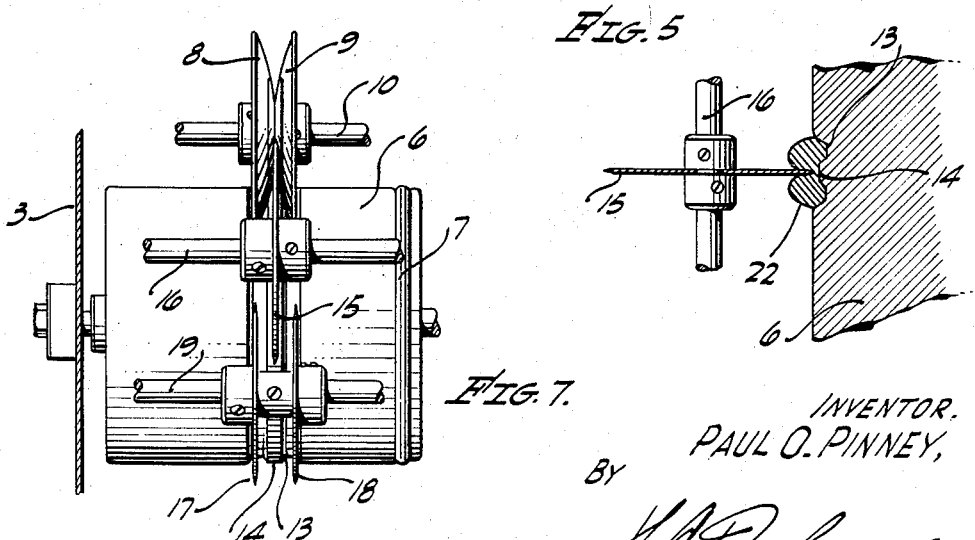

United States Patent Office 2,702,921
Patented Mar. 1, 1955

2,702,921
SHRIMP CUTTING MACHINE

Paul O. Pinney, Long Beach, Calif., assignor of fifty per cent to Harry Hinde, Los Angeles, Calif.

Application June 18, 1951, Serial No. 232,089

7 Claims. (Cl. 17—2)

This invention relates to a shrimp cutting machine whereby the shrimp is yieldably held in the machine against curling while it is going through the machine and is cut lengthwise through the shell and the body, thus enabling the shell to be easily and quickly removed.

An object of my invention is to provide a novel shrimp cutting machine which is simple in construction, inexpensive to manufacture and effective in operation.

Still another object of my invention is to provide a novel shrimp cutting machine in which the shrimp is fed manually into the machine, the machine in turn gripping the shrimp as it is fed into the flexible disks and holding the shrimp in a stretched out position while it is being cut lengthwise and subsequently cut a second time on each side of the center cut.

A feature of my invention is to provide a novel shrimp cutting machine of the character stated, which is light in weight and portable so that it can be easily moved from place to place, as is necessary.

Other objects, advantages and features of invention may appear from the accompanying drawing, the subjoined detailed description and the appended claims.

In the drawing:

Figure 1 is a perspective view of my shrimp cutting machine.

Figure 2 is a top plan view with parts broken away to show interior construction.

Figure 3 is a side view of the cutters, drum and motor.

Figure 4 is a fragmentary sectional view taken on the line 4—4 of Figure 3.

Figure 5 is a fragmentary sectional view taken on the line 5—5 of Figure 3.

Figure 6 is a fragmentary sectional view taken on the line 6—6 of Figure 3.

Figure 7 is a fragmentary end view of the machine showing the drum and the cutters.

Figure 8 is a perspective view of the guide fingers and the feed disks.

Referring more particularly to the drawing, my shrimp cutting machine 1 consists of a frame 2, which includes side plates 3—3, and a top cover 4. An electric motor 5 is mounted on the frame 2 for the purpose of driving the various cutters and disks of the machine, as will be subsequently described.

A feed drum 6 is mounted on a shaft 6' which shaft is journalled in the side plates 3—3 in bearings 6ª and 6ᵇ and is continuously rotated by the motor 5, by a suitable drive, such as a belt 7, which encircles the feed drum 6 and the drive shaft of the motor 5.

Above the feed drum 6 I provide a pair of flexible disks 8 and 9, which are fixedly mounted on the shaft 10 and the shaft in turn is journalled in the side plates 3—3 in bearings 10' and 10". The disks 8 and 9 are preferably made of rubber fabric or synthetic material and these disks can spread under pressure so as to grip the various sized shrimp as they enter the machine.

A pair of guide fingers 11 and 12 are fixedly mounted on top of the cover 4 and these fingers taper downwardly and inwardly towards the disks 8 and 9, substantially as shown. The fingers 11 and 12 are in exact alignment with the disks 8 and 9, substantially as shown, so that a shrimp fed lengthwise of the fingers 11 and 12 will be exactly centered between the disks 8 and 9 will thus be gripped by these disks, as will be subsequently described.

The drum 6 is formed with an annular groove 13 and a ridge 14 in the center of this groove acts as a support for the bottom of the shrimp as this shrimp is being cut. A single cutter knife 15 is mounted on the shaft 16 and this shaft in turn is journalled in the side plates 3—3 in bearings 16' and 16". The cutter disk 15 is positioned between the feed disks 8 and 9 and is exactly mid-way between them. The cutter disk 15 is also slightly spaced from the ridge 14 as shown in Figure 5, so that the shrimp is not entirely cut through.

A second pair of cutter disks 17 and 18 are mounted on the shaft 19, and the shaft in turn is journalled in the side plates 3—3 in bearings similar to bearings 16' and 16". The cutters 17 and 18 are positioned one on each side of the cutter 15, as shown in Figure 7, and the purpose of the last named cutters is to cut the external shell structure of the shrimp on each side of the central cut, thus enabling the shell of the shrimp to be removed more readily and also permits the shrimp to lie flat after it is cut. The sand vein found in the back of the shrimp will be cut by the disk 15, and when the second pair of disks 17 and 18 come into action the sand vein will be automatically discharged from the body of the shrimp.

A chain 20 encircles sprockets on each of the shafts 4, 10, 16 and 19, and also encircles a sprocket on the idler shaft 21, thus driving the feed disks 8 and 9 and the cutter discks 15, 17 and 18 continuously in one direction, the direction of rotation of all of these members being opposite to the direction of rotation of the feed drum 6.

In operation, the shrimp is fed by hand and head first between the fingers 11 and 12. The flexible disks 8 and 9 are revolving at a high rate of speed and as the shrimp engages these flexible feed disks, it will be drawn downwardly around the periphery of the drum 6. The bottom of the shrimp is pressed against the ridge 14, thus supporting the shrimp on the bottom and also holding the shrimp in proper position so that the cutter disks 15 can cut the same from end to end.

The shrimp continues to follow the periphery of the drum 6 and is carried past the revolving cutter disks 17 and 18, which cut the shell structure on each side of the cut previously made by the disks 15. These three lengthwise cuts of the shell of the shrimp, as well as into the body of the shrimp will permit the shell to be quickly and easily removed and allow the shrimp to lie flat after it is cut.

In Figures 4, 5 and 6 the shrimp is indicated in dotted lines and in its various positions by the numeral 22.

The shrimp is ejected from the machine after it has been cut as described previously. The shrimp follows the periphery of the drum 6 until it passes the cutter discs 17 and 18, at this point the shrimp will drop away from the drum 6. Due to the high velocity of the drum 6 the shrimp are thrown downwardly into a container (not shown). The cover of the machine is open at the bottom to permit the shrimp to drop out.

Having described my invention, I claim:

1. A shrimp cutting and deveining machine comprising a frame, a drum rotatably mounted within the frame, a shaft extending from the drum, journalling means for the shaft in the frame, a second shaft, said second shaft being parallel to the first named shaft, means journalling the second shaft in the frame, a pair of coaxial disks mounted on the second shaft, a third shaft parallel to the second shaft and below the second shaft, journalling means for the third shaft in the frame, a cutter disk mounted on the third shaft, the cutter disk being positioned below the first named disks, said first named disks and the cutter disk being arranged adjacent the periphery of said drum, a motor, drive means extending from the motor to said drum, and drive means extending from the drum to each of said shafts.

2. A shrimp cuttin gand deveining machine comprising a frame, a drum rotatably mounted within the frame, a shaft extending from the drum, journalling means for the shaft in the frame, a second shaft, said second shaft being parallel to the first named shaft, means journalling the second shaft in the frame, a pair of coaxial disks mounted on the second shaft, a third shaft parallel to the second shaft and below the second shaft, journalling means for the third shaft in the frame, a cutter disk mounted on the third shaft, the cutter disk being positioned below the first named disks, said first named disks and the cutter disk being arranged adjacent the periphery of said drum, a motor, drive means extending from the motor to said drum, and drive means extending from the drum to each of said shafts, said drum having an annular peripheral groove therein, said first named disks and the cutter disk being positioned in alignment with said groove.

3. A shrimp cutting and deveining machine comprising a frame, a drum rotatably mounted within the frame, a shaft extending from the drum, journalling means for the shaft in the frame, a second shaft, said second shaft being parallel to the first named shaft, means journalling the second shaft in the frame, a pair of coaxial disks mounted on the second shaft, a third shaft parallel to the second shaft and below the second shaft, journalling means for the third shaft in the frame, a cutter disk mounted on the third shaft, the cutter disk being positioned below the first named disks, said first named disks and the cutter disk being arranged adjacent the periphery of said drum, a fourth shaft, journalling means for the fourth shaft in the frame, a pair of cutter disks mounted on the fourth shaft, said cutter disks being coaxially mounted, the fourth shaft being parallel to each of the first named shafts, said cutter disks and the fourth shaft being positioned below the first named cutter disk, a motor, drive means extending from the motor to said drum, and drive means extending from the drum to each of said shafts.

4. A shrimp cutting and deveining machine comprising a frame, a drum rotatably mounted within the frame, a shaft extending from the drum, journalling means for the shaft in the frame, a second shaft, said second shaft being parallel to the first named shaft, means journalling the second shaft in the frame, a pair of coaxial disks mounted on the second shaft, a third shaft parallel to the second shaft and below the second shaft, journalling means for the third shaft in the frame, a cutter disk mounted on the third shaft, the cutter disk being positioned below the first named disks, said first named disks and the cutter disk being arranged adjacent the periphery of said drum, a fourth shaft, journalling means for the fourth shaft in the frame, a pair of cutter disks mounted on the fourth shaft, said cutter disks being coaxially mounted, the fourth shaft being parallel to each of the first named shafts, said cutter disks and the fourth shaft being positioned below the first named cutter disk, a motor, drive means extending from the motor to said drum, and drive means extending from the drum to each of said shafts, said drum having a centrally arranged peripheral groove therein, said groove being in alignment with the first named disks and the first named cutter disk.

5. A shrimp cutting and deveining machine comprising a frame, a drum rotatably mounted within the frame, a shaft extending from the drum, journalling means for the shaft in the frame, a second shaft, said second shaft being parallel to the first named shaft, means journalling the second shaft in the frame, a pair of coaxial disks mounted on the second shaft, a third shaft parallel to the second shaft and below the second shaft, journalling means for the third shaft in the frame, a cutter disk mounted on the third shaft, the cutter disk being positioned below the first named disks, said first named disks and the cutter disk being arranged adjacent the periphery of said drum, a motor, drive means extending from the motor to said drum, and drive means extending from the drum to each of said shafts, said drum having an annular peripheral groove therein, said first named disks and the cutter disk being positioned in alignment with said groove, said groove having a raised annular ridge in the center thereof.

6. A shrimp cutting and deveining machine comprising a frame, a drum rotatably mounted within the frame, a shaft extending from the drum, journalling means for the shaft in the frame, a second shaft, said second shaft being parallel to the first named shaft, means journalling the second shaft in the frame, a pair of coaxial disks mounted on the second shaft, a third shaft parallel to the second shaft and below the second shaft, journalling means for the third shaft in the frame, a cutter disk mounted on the third shaft, the cutter disk being positioned below the first named disks, said first named disks and the cutter disk being arranged adjacent the periphery of said drum, a fourth shaft, journalling means for the fourth shaft in the frame, a pair of cutter disks mounted on the fourth shaft, said cutter disks being coaxially mounted, the fourth shaft being parallel to each of the first named shafts, said cutter disks and the fourth shaft being positioned below the first named cutter disk, a motor, drive means extending from the motor to said drum, and drive means extending from the drum to each of said shafts, said drum having a centrally arranged peripheral groove therein, said groove being in alignment with the first named disks and the first named cutter disk, said groove having a raised annular ridge in the center thereof.

7. A shrimp cutting and deveining machine comprising a frame, a drum rotatably mounted within the frame, a shaft extending from the drum, journalling means for the shaft in the frame, a second shaft, said second shaft being parallel to the first named shaft, means journalling the second shaft in the frame, a pair of coaxial disks mounted on the second shaft, said disks being formed of a flexible material to yield in a direction parallel to the shaft mounting said disks, a third shaft parallel to the second shaft and below the second shaft, journalling means for the third shaft in the frame, a cutter disk mounted on the third shaft, the cutter disk being positioned below the first named disks, said first named disks and the cutter disk being arranged adjacent the periphery of said drum, a motor, drive means extending from the motor to said drum, and drive means extending from the drum to each of said shafts.

References Cited in the file of this patent

UNITED STATES PATENTS

| Number | Name | Date |
|---|---|---|
| 1,468,972 | Meissner | Sept. 25, 1923 |
| 2,263,697 | Grayson | Nov. 25, 1941 |
| 2,301,729 | Krull | Nov. 10, 1942 |
| 2,470,289 | Christiansen | May 17, 1949 |
| 2,515,101 | Swinden | July 11, 1950 |
| 2,521,640 | Laurin | Sept. 5, 1950 |
| 2,576,301 | Kuther | Nov. 27, 1951 |